United States Patent [19]

O'Brien, deceased et al.

[11] 4,022,976

[45] May 10, 1977

[54] MECHANICALLY-COUPLED MICROPHONE-SPEAKER UNIT AND INTERCOM SYSTEM

[76] Inventors: Jerry O'Brien, deceased, late of Jersey City, N.J.; by Catherine H. O'Brien, executrix, 33 Pamrapo Ave., Jersey City, N.J. 07305

[22] Filed: Apr. 19, 1976

[21] Appl. No.: 677,877

[52] U.S. Cl. .............................. 179/1 H; 179/141; 179/1 A
[51] Int. Cl.² ...................................... H04M 7/10
[58] Field of Search ................... 179/1 H, 141, 1 A

[56] References Cited
UNITED STATES PATENTS

| | | | |
|---|---|---|---|
| 1,134,059 | 3/1915 | Pearson | 179/1 A |
| 3,665,116 | 5/1972 | Holstrom | 179/1 H |

*Primary Examiner*—Kathleen H. Claffy
*Assistant Examiner*—E. S. Kemeny
*Attorney, Agent, or Firm*—Richard L. Miller

[57] ABSTRACT

This invention describes an electromechanical sound apparatus which can be utilized as part of a sound system such as an intercom or as an acoustic repeater. The apparatus includes a loudspeaker having a diaphragm and a coil. The coil receives variations of electric energy and causes the diaphragm to vibrate. An electromechanical sound (sensor/microphone) transducer is connected to the loudspeaker. The transducer includes conductive supports mounted onto the loudspeaker diaphragm and a weighted conductive bar loosely coupled to the supports. Electric energy is connected across the conductive supports. As the diaphragm vibrates, the vibrations are transmitted through the conductive supports to the bar, which interrupts the electrical energy and converts the vibrations into electrical energy variations. The loudspeaker diaphragm can be utilized to directly receive acoustic energy for the transducer, or as a standard loudspeaker output unit.

12 Claims, 4 Drawing Figures

MECHANICALLY-COUPLED MICROPHONE-SPEAKER UNIT AND INTERCOM SYSTEM

BACKGROUND OF THE INVENTION

This invention relates to an electromechanical sound apparatus, and more particularly to an apparatus which can be utilized for converting variations of electrical energy into corresponding variations of acoustic energy and also for converting acoustic energy into variations of electrical energy.

Sound apparatus are well known in the art. However, such apparatus are generally complex and require numerous components, including complicated electronic equipment and amplification systems. A greatly simplified sound transducer has been described in co-pending U.S. patent application Ser. No. 454,224 entitled "Electromechanical Amplifier Sound Transducer", filed on Mar. 25, 1974, now U.S. Pat. No. 3,970,894. In that application there is described an electromechanical amplifier sound transducer including a diaphragm which receives acoustic waves or mechanical pulses and vibrates in response thereto. Conductive supports are mounted onto the diaphragm and are adapted to be interconnected to a source of electrical energy. A weighted conductive bar is loosely coupled to the supports. When the diaphragm vibrates in response to the acoustic waves or the mechanical pulses, the supports transmit the vibrations to the bar, whereby the bar can control the electrical energy delivered from the source of electrical energy, so that the acoustic waves or the mechanical pulses are converted into amplified electrical waves.

A further improvement upon this basic concept was provided in my U.S. Pat. No. 3,909,558 entitled ELECTROMECHANICAL AMPLIFIER SOUND TRANSDUCER WITH COMBINED POWER SOURCE, wherein the conductive bar is formed by a battery so that the electrical energy forms an integral part of the transducer itself. The entire transducer is included within a housing and the housing serves as the diaphragm of the transducer for receiving acoustic waves.

In each of my aforementioned inventions, the sound transducer was utilized to receive the acoustic energy and convert it into variations of electric energy. However, a loupspeaker would then have to be electrically connected in series with the transducer in order to provide audible outputs for the variations of electrical energy. It has been found, however, that by placing the transducer directly on the diaphragm of the speaker, unique and unexpected results occur which permit the formation of a simplified integral apparatus which can then form the basis of numerous sound systems.

It is accordingly an object of the present invention to provide an improved sound apparatus which can be utilized in various sound systems.

A further object of the present invention is to provide an apparatus which combines a loudspeaker with an electromechanical sound transducer to product a unique integral unit.

Still a further object of the present invention is to provide a single apparatus formed by integrating the structure of a loudspeaker and an electromechanical sound transducer which can be utilized as part of an intercom system.

A further object of the present invention is to provide a sound apparatus having a loudspeaker with an electromechanical sound transducer mounted as part of the loudspeaker, wherein the loudspeaker can be utilized as the diaphragm of the transducer for receiving acoustic energy, as well as a loudspeaker diaphragm for producing acoustic energy.

A further object of the present invention is to provide an apparatus including the integral combination of a loudspeaker and an electromchanical sound transducer, which can be utilized to convert variations of electrical energy into corresponding variations of acoustic energy, as well as for converting acoustic energy into variations of electrical energy.

Yet another object of the present invention is to provide an apparatus which combines a loudspeaker and an electro-mechanical sound transducer which can be utilized as part of an intercom system for providing audible sounds as well as a buzzing sound.

Still a further object of the present invention is to provide a sound aparatus combining a loudspeaker and an electromechanical sound transducer as an integral device which can be used as a repeater station in a sound transmission system.

Still a further object of the present invention is to provide a sound apparatus combining a loudspeaker and an electromechanical sound transducer as an integral device which can be used as a repeater station in a sound transmission system.

Still a further object of the present invention is to provide an intercom system utilizing individual stations each of which includes an integral apparatus containing a loudspeaker and an electromechanical sound transducer.

Yet another object of the present invention is to provide a repeater station for a sound transmission system, wherein the station utilizes an integral apparatus combining a loudspeaker and an electromechanical sound transducer.

These and other objects, features and advantages of the invention will, in part, be pointed out with particularity and will, in part, become obvious from the following description of the invention, taken in conjunction with the accompanying drawings which forms an integral part thereof.

SUMMARY OF THE INVENTION

Briefly, the invention provides a sound apparatus including a loudspeaker and an electromechanical sound transducer formed together with a single station. The loudspeaker is capable of converting variations of electrical energy into corresponding variations of acoustical energy, and includes a diaphragm and coil means coupled to the diaphragm. The coil means receives the variations of electrical energy and in response thereto causes the diaphragm to vibrate. The electromechanical sound transducer can convert acoustic energy into variations of electrical energy. The sound transducer includes conductive support means mounted onto the loudspeaker diaphragm and adapted to be connected to a source of electrical energy. A weighted conductive bar means is loosely coupled to the support means. The support means transmits vibrations of the diaphragm to the bar means.

In one embodiment of the invention, two such stations are utilized as the terminals of an intercom system, and further includes a single energy source. A first switching means selectively interconnects the energy source in series between a coil means of one station and a sound transducer of another station. The diaphragm of each of the loudspeakers can be utilized both to receive direct acoustic energy as well as to produce acoustic energy.

In that embodiment of the invention, a second switching means is also included in the intercome and selectively interconnects the energy source in series with a coil and transducer of one station, together with a coil of the other station to thereby produce a buzzer signal on the intercom.

In the other embodiment of the invention, a second station is also included and an energy source is serially interconnected between the transducer of the first station with the coil means of the second station to thereby form a repeater station in a sound transmission system.

BRIEF DESCRIPTION OF THE DRAWING

In the drawing.

In the various figures of the drawing, like reference characters designate like parts.

DESCRIPTION OF THE PREFERRED EMBODIMENTS

Figure 1:
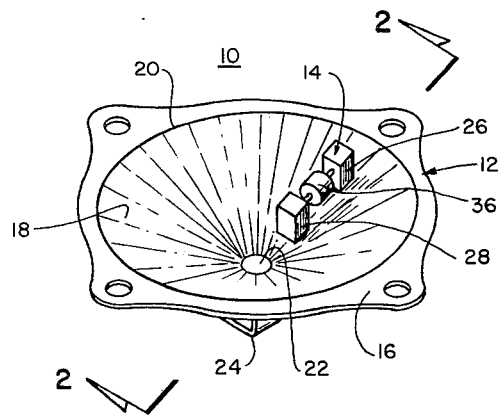
FIG. 1 is a perspective view of the sound apparatus of the present invention.
Figure 2:
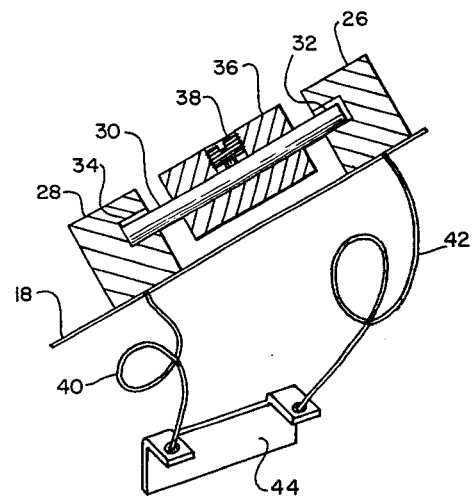
FIG. 2 is a partial sectional view of the transducer taken along line 2—2 of FIG. 1 and further including output terminals.

Referring now to FIGS. 1 and 2, there is shown the apparatus of the present invention generally referred to at 10, including a loudspeaker unit 12 and an electromechanical sound transducer 14 mounted thereon. The loudspeaker includes a frame 16 on which is connected a diaphragm 18, shown as a conical surface having its outer peripheral edge 20 connected to the frame 16 and its inner edge 22 being circularly open. A coil means 24 is connected to the diaphragm, as is well known in the art.

Typically, the loudspeaker converts variations of electric energy into corresponding variations of acoustic energy, i.e., sound. One such typical loudspeaker contains a coil attached to the cone diaphragm. The coil oscillates either inside an electromagnet or in the annular cavity of a permanent magnet. The coil is fed with an electric current which is varied by means of an acoustic sound produced elsewhere. The varied electric current causes the coil to move. Such movements are transmitted to the cone diaphragm which causes it to reproduce the original acoustic sound. Other types of loudspeakers are well known in the art, however, in each case, there is generally utilized a coil which receives the variations in electric current and causes a diaphragm to vibrate, thereby reproducing the acoustic sound.

The electromechanical sound transducer herein utilized is the type described in co-pending application Ser. No. 454,224, heretofore referred to. Such transducer includes conductive supports 26, 28 which are pleaced directly on the diaphragm of the loudspeaker. A weighted conductive bar 30 is positioned within holes 32, 34 formed in the supports 26, 28. The holes are axially aligned and are slightly larger than the diameter of the bar 30 so as to permit the bar to be loosely coupled to the support means. Connected on the bar 30 is a weight 36 which is held in place by means of the set screw 38. The weight 36 is shown as a cylindrical section whose length is shorter than the length of the conductive bar. The weight 36 can be longitudinally positioned along the length of the bar and is held in place at that position by means of the set screw 38. As was explained in the aforementioned patent application, by moving the weight along the position of the bar various amplification characteristics of the transducer can be modified.

Wire 40, 42 are respectively connected to the conductive supports 26, 28 through which electrical energy can be applied. The ends of the wires are shown connected to a terminal block 44 through which connects can be made.

Utilizing the apparatus heretofore described there results an integrating effecting between the loudspeaker and the sound transducer. For example, when variations of electrical signals are applied to the coil 24 of the loudspeaker, the diaphragm 18 will be caused to vibrate to thereby reproduce the acoustic sounds. However, as the diaphragm 18 vibrates, the conductive supports 26, 28 will transmit the vibrations to the conductive bar 30 which will vibrate and move within the holes 32, 34. If the conductive supports 26, 28 are interconnected to a source of electric energy, the conductive bar will interrupt the flow of that energy to thereby produce variations of electrical energy which will correspond to the acoustic energy produced by the diaphragm. In this manner, the loudspeaker serves to convert variations of electrical energy into corresponding variations of acoustic energy, while the transducer at the same time converts the acoustic energy back into variations of electric energy.

At the same time, the loudspeaker diaphragm 18 can be used as the direct receiver of acoustic energy, as for example, by directly talking into the loudspeaker. The diaphragm will then be caused to vibrate in direct response to the acoustic energy.

The vibrations of the diaphragm will then cause the conductive supports 26, 28 to transmit the vibrations to the conductive bar 30. By interconnecting an energy source across the conductive supports, the acoustic energy can be converted into variations of electric energy. In the aforedescribed ways, the loudspeaker diaphragm is utilized both as part of the loudspeaker itself, to produce acoustic waves, and also as the diaphragm for the electromechanical transducer for converting acoustic waves into variations of electrical energy. The diaphragm is thus used for both receiving acoustic waves for the transducer, and producing acoustic waves for the loudspeaker.

However, a further use of the apparatus described can be obtained by electrically interconnecting one of the conductive supports with one end of the loudspeaker coil. The serial combination can then be interconnected across a source of energy. The source of energy will then energize the coil of the loudspeaker and will attract the conductive bar towards the coil as an armature is attracted to an electromagnet. This will then cause an interruption of the flow of electric current to the coil which will de-energize the coil and permit the conductive bar to return to its normal position. However, in its normal position it will complete the series circuit to again energize the coil. This iterative process causes a buzzing sound similar to that of a buzzer apparatus. The buzzing sound can be audibly head by means of a further loudspeaker.

Figure 3:
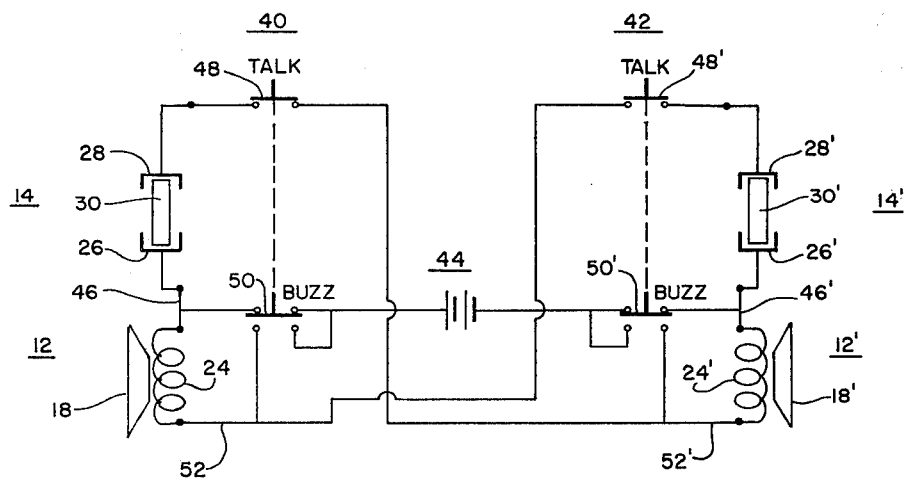
FIG. 3 is a schematic circuit diagram showing an intercom system utilizing the apparatus of the present invention.

The aforementioned apparatus can be utilized in various types of sound systems. By way of example, there will be described an intercom system wherein the apparatus is utilized both as a sound producing instrument of the intercom system, as well as a buzzer to call attention. Referring now to FIG. 3 there is shown a first station 40 and a second station 42 operating as the two terminals of an intercom system. A single energy source 44, shown as a battery, is utilized to energize both stations of the system. Each of the stations 40, 42 includes an apparatus of the type heretofore described. Components of one station will be described and components of the other station will be designated by the same numbers with a prime. In station 40, the loudspeaker 12 includes a diaphragm 18 and a coil 24. The transducer includes the supports 26, 28 and the conductive bar 30. One end of the coil 24 is shown interconnected to one of the conductive suppors 26 at a terminal 46.

Each of the stations includes a switching device having a first switch 48 as a "press to talk" switch and a buzzer switch 50 utilized to call the other station. The buzzer switch 50 has a first position interconnecting the energy source 44 with the terminal 46. In is second position, the buzzer switch 50 interconnects the energy source 44 with the opposite end 52 of the coil 24. The press to talk switch 48 interconnects the other conductive support 28 with the opposite end of the coil 18' in the station 42 at the point 52'.

The buzzer switch 50 is normally in its first position interconnecting the energy source 44 to terminal 46. When the press to talk switch 48 is operated, the buzzer switch 50 is therefore in its first position. The switches are interconnected, such that when the buzzer switch 50 is placed to its second position interconnecting to terminal 52, the press to talk switch 48 is automatically closed.

While only one station 40 has been described, it will be understood that each of the corresponding items in the second station 42 are identical and are identified by primed numbers. In operation, when someone at the first station desires to talk to someone at the second station, the press to talk switch 48 is closed. The flow of current will then be from the energy source 44 through the buzzer switch 50 to the terminal 46. The current will pass through the transducer 14 and the switch 48 to the terminal 52' of the second station 42. The current will then pass through the coil 24' to the terminal 46', through the buzzer switch 50' and back to the energy source 44. No current will flow through the coil 24 since the switch 48' is opened. It will therefore be seen that with the press to talk switch 48 depressed, the transducer of the first station is serially interconnected with the loudspeaker 12' of the second station through the energy source 44. The loudspeaker 12 of the first station, although not electrically interconnected, is utilized as the direct pickup of acoustic sound. Thus, the user at the first station will talk into the diaphragm 18 of the loud speaker 12 which will cause the diaphragm 18 to vibrate and in turn cause the conductive bare 30 to convert the acoustic energy into electrical variations. These electrical variations will then be transmitted to the coil 24' of the second station 42 where they will be converted by the loudspeaker 12' into audible sound which will be heard on the diaphragm 18' at the second station 42. In a similar manner, when a user at the second station 42 wishes to talk to someone at the first station 40, the switch 48' will be depressed.

When someone at the first station wishes to buzz the second station and thereby call attention, the buzzer switch 50 will be depressed to plce it in its second position. As heretofore explained, depression of the buzzer switch 50 also causes the switch 48 to close. With both these switches closed, the coil 24 will be electrically in series with the transducer 14 of the first station 40. Electrical energy will flow from the battery 44 through the buzzer switch 50 to the point 52 of coil 24, and then through the conductive suppots 26, 28 to switch 48. Current will then flow into the terminal 52' of the second station 42 and pass through the coil 24' the buzzer switch 50' and back to he source 44. Current will not flow through the transducer 14' of the second station 42 since the switch 48' of station 42 is open. The energy source 44 will then cause the coil 24 to attract the conductive bar 30 which will interrupt the flow of current and de-energize the coil 24. The bar 30 will then return to its normal position to again energize the coil 24. This continuous series of interruptions and reconnections will cause a buzzing sound which will be heard on the loudspeaker 12' at the second station 42. In a similar manner, when a user at the second station 42 wishes to buzz the first station 40, the switch 50' will be depressed to its second position.

It is therefore realized that utilizing the embodiment shown in FIG. 3, only a single source of energy need be used for operating the two stations of the intercom. There need not be provided a separate energy source for each of the stations. Furthermore, by interconnection the apparatus heretofore described containing a loudspeaker in integral relationship with a sound transducer, there is provided a unique device which provides simplification for an intercom system. In addition, both buzzing and talking can be achieved using the same instrument.

Figure 4:
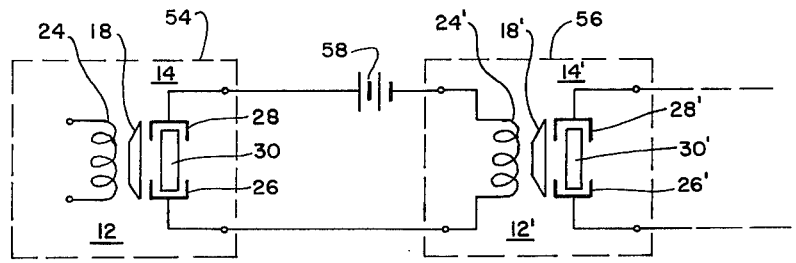
FIG. 4 is a schematic circuit diagram showing a repeater station utilizing the apparatus of the present invention.

An additional use of the novel apparatus of the present invention is as a epeater station for a sound transmitting system. Referring now to FIG. 4, there is shown a first repeater 54 and a second repeater 56. The two repeaters are interconnected by means of an energy source 58. Each repeater includes a loudspeaker 12 with an integral sound transducer 14. The loudspeaker includes a coil 24 and a diaphragm 18 having mounted thereon the conductive terminals 26, 28 of the sound transducer with the bar 30 supported by the conductive support. The second station 56 contains identical items as the first and are identified by primed numbers.

The energy source 58 is connected in series between the transducer 14 of one station 54 and the coil 24' of the next station 56. More specifically, the conductive supports 26, 28 of station 54 are connected in series with the ends of the coil 24' of station 56 with the energy source 58 connected therebetween.

In operation, the variations of electric energy are supplied to the coil 24 of the first station 54. The electrical variations are converted to acoustic energy by means of the diaphragm 18. The vibrations of the diaphragm 18 cause the conductive bar 30 to vibrate to thereby convert the acoustic energy back into electric variations which are transmitted to the coil 24' of the next station 56. In this way, electrical variations are repeated for the next station. However, since the electromechanical sound transducer also amplifies the sound, the repeater station produces an amplified output for the next station.

Although only two such applications have been heretofore described, it will be apparent that the apparatus of the present invention will find unique use in various sound systems. The apparatus is easily produced and has numerous types of uses.

These has been disclosed heretofore the best embodiments of the invention presently contemplated. However, it is to be understood that various changes and modifications may be made thereto without departing from the spirit of the invention.

What is claimed is:

1. A sound apparatus comprising:
 a. a loudspeaker for converting variations of electric energy into corresponding variations of acoustic energy, including:
   1. a diaphragm;
   2. coil means coupled to the diaphragm, said coil means adapted to receive the variations of electric energy and in response thereto causing said diaphragm to vibrate, and
 b. an electromechanical sound transducer for converting acoustic energy into variations of electric energy, including:
   3. conductive support means mounted onto said loudspeaker diaphragm and adapted to be connected to a source of electric energy;
   4. weighted conductive bar means loosely coupled to said support means, said support means transmitting vibrations of said diaphragm to said bar means,
 and wherein said loudspeaker and said sound transducer form a first station.

2. The apparatus as in claim 1 and further comprising a second loudspeaker of the type described in claim 1, and a second electromechanical sound transducer of the type described in claim 1, said second loudspeaker and second sound transducer integrally connected to form a second station, an energy source, and first switching means selectively interconnecting said energy source in series between a coil means of one station and a sound transducer of another station, and wherein each of said diaphragms can receive direct acoustic energy and vibrate in response thereto, thereby producing an acoustic intercom.

3. The apparatus as in claim 2 and wherein one end of each coil is connected to one of the support means of the transducer in its own respective station to respectively define first and second terminals in said first station and second station at the respective interconnections, said energy source being coupled between said first and second terminals, and wherein said first switching means includes a first switch serially interconnecting the other of the support means of said first station to the other end of the coil means of said second station, and a second switch serially interconnecting the other of the support means of said second station to the other end of the coil means of said first station.

4. The apparatus as in claim 2 and further comprising second switching means selectively interconnecting said energy source in series with a coil and transducer of one station, and together with a coil of the other station, to thereby produce a buzzer signal on the intercom.

5. The apparatus as in claim 3 and further comprising third and fourth switches respectively interconnecting said energy source to said first and second terminals when in their respective first positions and in their respective second positions interconnection said energy source to the other ends of the coils in their respective stations, said first and third switches being coupled together and said second and fourth switches being coupled together, whereby when said first and second switches are selective operated, said third and fourth switches ae respectively in their first positions, and when said third and fourth switches are selectively operated, said first and second switches are respectively operated simultaneously therewith, said first and second switches permitting talking on the intercom and said third and fourth switches permitting buzzing on the intercom.

6. The apparatus as in claim 1 and further comprisng a second loudspeaker of the type described in claim 1 and a second electromechanical sound transducer of the type described in claim 1, said second loudspeaker and said second sound transducer integrally connected to form a second station, and an energy source serially interconnecting the transducer of said first station with the coil means of said second station, whereby each of said stations forms an acoustic repeater.

7. The apparatus as in claim 1 and wherein said diaphragm is of conical shape, and wherein said conductive supports are mounted on the inside surface of the cone and along an axial line thereof.

8. The apparatus as in claim 1 and wherein the diaphragm is of non-conductive material.

9. The apparatus as in claim 1 and wherein said weighted conductive bar includes a weight means affixed thereto.

10. The apparatus as in claim 9 and wherein said weight means is adjustable along the length of said bar means.

11. The apparatus as in claim 1 and further comprising conductive terminals respectively connected to said conductive support means.

12. An intercom comprising first and second stations, each station including:
 a. a loudspeaker for converting variations of electric energy into corresponding variations of acoustic energy, including:
   1. a diaphragm;
   2. coil means coupled to the diaphragm, said coil means adapted to receive the variations of electric energy and in response thereto causing said diaphragm to vibrate;
 b. an electromechanical sound transducer for converting acoustic energy into variations of electric energy, including:
   3. conductive support means mounted onto said loudspeaker diaphragm and adapted to be connected to a source of electric energy;
   4. weighted conductive bar means loosely coupled to said support means, said support means transmitting vibrations of said diaphragm to said bar means;
 c. an energy source; and
 d. first switching means selectively in disconnecting said energy source in series between a coil means of one station and a sound transducer of another station, and wherein each of said diaphragms can receive direct acoustic energy and vibrate in response thereto.

* * * * *